US009348418B2

(12) United States Patent
Chou et al.

(10) Patent No.: US 9,348,418 B2
(45) Date of Patent: May 24, 2016

(54) GESTURE RECOGNIZING AND CONTROLLING METHOD AND DEVICE THEREOF

(71) Applicant: Wistron Corporation, New Taipei (TW)

(72) Inventors: Chia-Te Chou, New Taipei (TW); Shou-Te Wei, New Taipei (TW); Wei-Jei Chiu, New Taipei (TW); Chih-Hao Huang, New Taipei (TW)

(73) Assignee: Wistron Corporation, New Taipei (TW)

( * ) Notice: Subject to any disclaimer, the term of this patent is extended or adjusted under 35 U.S.C. 154(b) by 78 days.

(21) Appl. No.: 14/051,456

(22) Filed: Oct. 11, 2013

(65) Prior Publication Data
US 2014/0210704 A1    Jul. 31, 2014

(30) Foreign Application Priority Data
Jan. 29, 2013  (TW) .............................. 102103364 A

(51) Int. Cl.
*G06F 3/01*    (2006.01)
*G06K 9/00*   (2006.01)
(52) U.S. Cl.
CPC ............ *G06F 3/017* (2013.01); *G06K 9/00389* (2013.01)
(58) Field of Classification Search
CPC . G06F 3/017; G06K 9/00335; G06K 9/00389
See application file for complete search history.

(56) References Cited

U.S. PATENT DOCUMENTS

| | | | | |
|---|---|---|---|---|
| 6,147,678 A | * | 11/2000 | Kumar et al. | ................ 345/158 |
| 6,222,465 B1 | * | 4/2001 | Kumar et al. | ................ 341/20 |
| 2004/0068409 A1 | * | 4/2004 | Tanaka et al. | ................ 704/272 |
| 2009/0220157 A1 | * | 9/2009 | Kato et al. | .................... 382/201 |
| 2011/0197263 A1 | * | 8/2011 | Stinson, III | ....................... 726/4 |
| 2012/0128201 A1 | * | 5/2012 | Brickhill | ............ G06K 9/00362 382/103 |
| 2012/0157198 A1 | * | 6/2012 | Latta | ....................... A63F 13/10 463/31 |
| 2012/0242800 A1 | * | 9/2012 | Ionescu et al. | .................. 348/46 |
| 2012/0293411 A1 | * | 11/2012 | Leithinger et al. | ............ 345/158 |
| 2013/0050225 A1 | * | 2/2013 | Nakajima | ............... G06T 13/40 345/473 |
| 2013/0088422 A1 | * | 4/2013 | Niikura et al. | ................ 345/156 |

OTHER PUBLICATIONS

"Office Action of Taiwan Counterpart Application", issued on May 27, 2015, with English translation thereof, p. 1-p. 9, in which the listed references were cited.
"Office Action of Taiwan Counterpart Application", issued on Feb. 26, 2016, with English translation thereof, p. 1-p. 10.

* cited by examiner

*Primary Examiner* — Alexander Eisen
*Assistant Examiner* — Chun-Nan Lin
(74) *Attorney, Agent, or Firm* — Jianq Chyun IP Office

(57) ABSTRACT

A gesture recognizing and controlling method and device thereof are provided. The gesture recognizing and controlling method includes the following steps. First, a pending image having depth information is captured, in which the pending image includes a human form image. The human form image is analyzed so as to obtain hand skeleton information having a first skeleton and a second skeleton. It is determined whether the first skeleton and the second skeleton have an intersection point. If yes, it is determined whether an included angle formed by the first skeleton and the second skeleton is within a predetermined angle range. When the included angle is within the predetermined angle range, a controlling signal is output accordingly.

15 Claims, 6 Drawing Sheets

(a)

(b)

(c)

(a)

(b)

(a)

(b)

(c)

GESTURE RECOGNIZING AND CONTROLLING METHOD AND DEVICE THEREOF

CROSS-REFERENCE TO RELATED APPLICATION

This application claims the priority benefit of Taiwan application serial no. 102103364, filed on Jan. 29, 2013. The entirety of the above-mentioned patent application is hereby incorporated by reference herein and made a part of this specification.

BACKGROUND OF THE INVENTION

1. Field of the Invention

The invention relates to a recognizing method and controlling method and a device thereof, and more particularly relates to a gesture recognizing and controlling method and a device thereof.

2. Description of Related Art

Mouses, keyboards and joysticks are conventional interfaces for human-computer interaction. Along with the continuous development of new technologies such as touch control and voice control, which are developed to further improve convenience in human-computer interaction. Somatosensory control is a brand new input method aiming to provide human-computer interaction with more user-friendly. Among which, gesture recognizing is one of somatosensory control since gesture is intuitive and convenient for people to communicate with one another in daily life. Lately, consumer attention being gradually focused on gesture recognizing which has been applied to various fields such as human-computer interaction design, medical rehabilitation, virtual environment, digital art design and gaming design.

Information for gesture recognizing is mainly classified into two types: dynamic gesture and static gesture. Dynamic gesture information includes a hand movement trajectory, position information and a timing relation, and the static gesture information mainly relates to a variation to a hand shape. By analyzing said gesture information, human-computer interaction functionality may be achieved according to different gestures. A method for gesture recognizing utilizes a depth camera to obtain images with depth information, pre-processes such as image binaryzation, image background deletion and noise elimination are required for each image, so that information related to hand position and gesture of the user may be captured from a series of images. Later, image coordinate value of the hand position may be used to control a cursor of the display. Since pre-processes require more time consuming, it is difficult to match the same speed and accuracy for moving the cursor with a mouse. Therefore, it is critical to improve an interface for gesture controlling so as to achieve a goal of human-computer interaction in real time.

SUMMARY OF THE INVENTION

Accordingly, the invention is directed to a gesture recognizing and controlling method and a device thereof, by analyzing the hand skeleton information, the control signal may be directly output to the multimedia device and steps for the user to control the cursor gestures may also be reduced.

The invention provides a gesture recognizing and controlling method, including the following steps: First, capturing a pending image having depth information, in which the pending image includes a human form image. Analyzing the human form image to obtain hand skeleton information having a first skeleton and a second skeleton. Determining whether an intersection point is existing between the first skeleton and the second skeleton. Determining whether an included angle formed by the first skeleton and the second skeleton is within a first predetermined angle range if the intersection point is exist. Outputting a controlling signal when the included angle is within the first predetermined angle range.

According to an embodiment of the invention, the gesture recognizing and controlling method further includes calculating a first ratio according to a position of the intersection point within the first skeleton, and calculating a second ratio according to a position of the intersection point within the second skeleton. A pause controlling signal representing a pause function is output when at least one of the first ratio and the second ratio is less than a first threshold value. A stop controlling signal representing a stop function is output when both of the first ratio and the second ratio are within a predetermined ratio range.

According to an embodiment of the invention, in which when the intersection point is absent between the first skeleton and the second skeleton, the gesture recognizing and controlling method further includes determining whether an extended intersection point is exist between the first skeleton and the second skeleton. Determining whether an included angle of the extended intersection point is within a second predetermined angle range if the extended intersection point is existing. Outputting another controlling signal when the included angle of the extended intersection point is within the second predetermined angle range.

According to an embodiment of the invention, the gesture recognizing and controlling method further includes calculating a midpoints-connection length between the first skeleton and the second skeleton. Generating said another controlling signal correspondingly according to a variation of the midpoints-connection length.

According to an embodiment of the invention, the step of outputting said another controlling signal correspondingly according to the variation of the midpoints-connection length further includes outputting a first volume controlling signal representing a volume-up function when the midpoints-connection length is increased; and outputting a second volume controlling signal representing a volume-down function when the midpoints-connection length is reduced.

The invention provides another gesture recognizing and controlling method, including the following steps: First, capturing a pending image having depth information. Next, analyzing the pending image by adopting a Blob detection thereby determining a number of connected area in the pending image. Analyzing a first barycenter position of a first connected area and a second barycenter position of a second connected area in the pending image when the number of connected area is two. Outputting a controlling signal correspondingly according to a variation of a barycenters-connection length between the first barycenter position and the second barycenter position.

The invention further provides a gesture recognizing and controlling device including an image capturing unit, a storage unit and a processing unit. Therein, the image capturing unit is configured to capture a pending image having depth information, in which the pending image includes a human form image. The storage unit storing the pending image and a computer readable and writable software. The processing unit is configured to execute a plurality of commands of the computer readable and writable software, in which the commands include the following: Analyzing the human form image to obtain hand skeleton information having a first skeleton and a second skeleton. Determining whether an intersection point is existing between the first skeleton and the second skeleton. Determining whether an included angle formed by the first skeleton and the second skeleton is within a first predetermined angle range if the intersection point is exist. When the included angle is within the predetermined angle range, a controlling signal is output accordingly.

Further, The gesture recognizing and controlling method and the device thereof provided by the invention may analyze the hand skeleton information as to output the control signal to the multimedia device directly, the predetermined application may be executed directly by the multimedia device according to the control signal. Accordingly, the gesture may be utilized to achieve operations similar to a hot-key function and reduce steps for the user to control a cursor with gestures on a display monitor of the multimedia device.

To make the above features and advantages of the disclosure more comprehensible, several embodiments accompanied with drawings are described in detail as follows.

DESCRIPTION OF THE EMBODIMENTS

Figure 1:
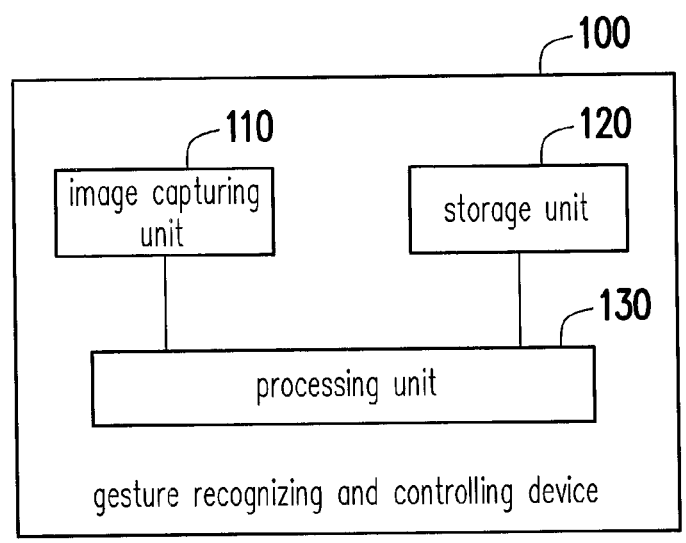
FIG. 1 is a block diagram illustrating a gesture recognizing and controlling device according to an embodiment of the invention.

FIG. 1 is a block diagram illustrating a gesture recognizing and controlling device according to an embodiment of the invention. Referring to FIG. 1, according to an embodiment, a gesture recognizing and controlling device 100 may be connected by using a wired method or a wireless method to a multimedia device (not illustrated) such as a smart TV. In another embodiment, the gesture recognizing and controlling device 100 may be, for example, embedded and integrated inside the multimedia device. For instance, the gesture recognizing and controlling device 100 may be, a set-top box (STB) connected externally to the smart TV. The gesture recognizing and controlling device 100 receives and recognizes a variation to a gesture of a user, so as to generate a control signal correspondingly. The control signal is transmitted to the smart TV to control the smart TV for executing a predetermined application corresponding to the gesture. Accordingly, complicated steps for the user to control a cursor on a display monitor of the multimedia device using the gesture may then be reduced.

The gesture recognizing and controlling device 100 is explained as follows. The gesture recognizing and controlling device 100 includes an image capturing unit 110, a storage unit 120 and a processing unit 130. Details are illustrated below.

The image capturing unit 110 includes a depth camera configured to capture a two-dimensional (2D) image and a three-dimensional (3D) image. The depth camera may be used to determine a distance between an object and the depth camera, so as to obtain a depth image (or depth map) which represents a proximity of the object captured in the image. The depth image is an image utilizing a gray level value of 0 to 255 to indicate distance information, which may convert the 2D image into the 3D image correspondingly. Therefore, the 3D image is actually the 2D image with the depth image information, known as a 2D+D (2D+Depth) image. The depth camera may be, for example, a time-of-flight camera, a stereo vision depth camera, a laser speckle camera or a laser tracking camera, the invention is not limited thereto.

The storage unit 120 may be a fixed or movable device in any possible forms, for example, a random access memory (RAM), a read-only memory (ROM), a flash memory, a hard drive or other similar devices, which are capable of storing a computer readable and writable software, the image and other information.

The processing unit 130 may be, for example, a central processing unit (CPU) or other programmable devices for general purpose or special purpose such as a microprocessor and a digital signal processor (DSP), which are capable of loading the computer readable and writable software for executing a plurality of commands.

Figure 2:
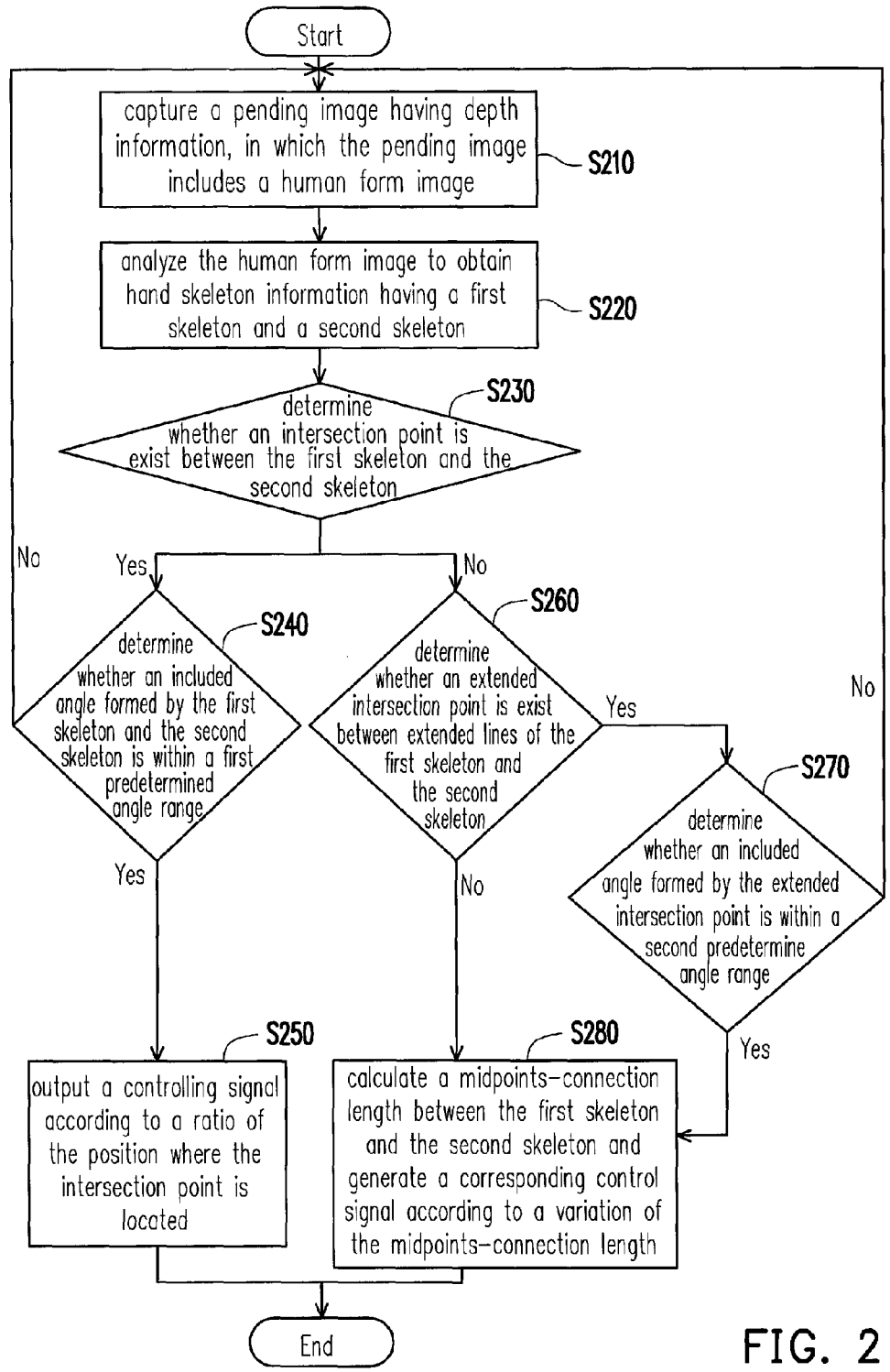
FIG. 2 is a flowchart illustrating a gesture recognizing and controlling method according to an embodiment of the invention.

FIG. 2 is a flowchart illustrating a gesture recognizing and controlling method according to an embodiment of the invention. Said method of the present embodiment is adapted for the gesture recognizing and controlling device 100 depicted in FIG. 1. In the present embodiment, the gesture recognizing and controlling 100 may be, for example, coupled to the smart TV. Detailed steps of the present embodiment are described as below, with reference according to each element in the gesture recognizing and controlling 100.

In step S210, the image capturing unit 110 captures a pending image having depth information, in which the pending image includes a human form image. Therein, the image capturing unit 110 may, for example, captures the 2D image and the 3D image simultaneously or sequentially.

In step S220, the processing unit 130 analyzes the human form image to obtain hand skeleton information having a first skeleton and a second skeleton. In the present step, the processing unit 130 may obtain the hand skeleton information by using at least two different types of the analyzing methods. The hand skeleton information may include, for example, a length and a shape of the hand skeleton, a coordinate corresponding to a position in the pending image, the depth information, but the invention is not limited thereto. Therein, methods for the processing unit 130 to obtain the hand skeleton information by analyzing the human form image will be described later.

Figure 3:
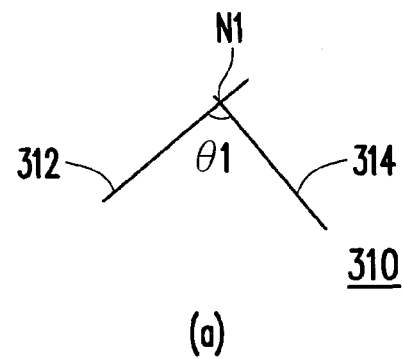
FIG. 3(a) to FIG. 3(c) are brief schematic views illustrating a first to a third hand skeletons.
Figure 3:
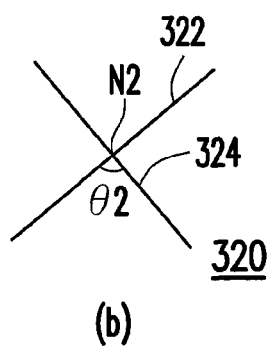
Figure 3:
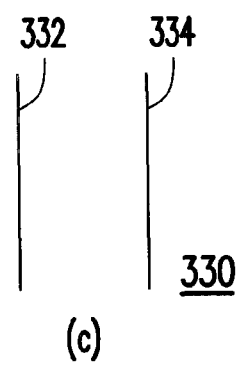

Proceeding to step S230 after the hand skeleton information is obtained, so the processing unit 130 may determine whether an intersection point is present between the first skeleton and the second skeleton. For instance, FIG. 3(a) to FIG. 3(c) are brief schematic views illustrating a first to a third hand skeletons. Referring to FIG. 3(a), the hand skeleton 310 includes a first skeleton 312 and a second skeleton 314, which respectively corresponding to a left hand and a right hand of the human form image, in which an intersection point N1 is exist between the first skeleton 312 and the second skeleton 314. Similarly, referring to FIG. 3(b), the hand skeleton 320 includes a first skeleton 322 and a second skeleton 324, and an intersection point N2 is exist. Referring back to FIG. 3(c), the hand skeleton 330 includes a first skeleton 332 and a second skeleton 334, and an intersection point is absent in the hand skeleton 330.

Proceeding to step S240 if the intersection is exist between the first skeleton and the second skeleton; proceeding to step S260 if the intersection is absent between the first skeleton and the second skeleton.

In step S240, the processing unit 130 is proceeded to determine whether an included angle formed by the first skeleton and the second skeleton is within a first predetermined angle range. More specifically, the included angle formed by the first skeleton and the second skeleton may be, for example, an included angle with an opening facing down, and the first predetermined angle range is, for example, set to 80 degrees to 100 degrees. However, the invention is not limited thereto, above settings may be adjusted by the user based on actual requirements. Take FIG. 3(a) as an example, the processing unit 130 may, for example, determine whether the an included angle θ1 formed by the first skeleton 312 and the second skeleton 314 is within the range of 80 degrees to 100 degrees. Take FIG. 3(b) as an example, the processing unit 130 may, for example, determine whether the an included angle θ2 formed by the first skeleton 322 and the second skeleton 324 is within the range of 80 degrees to 100 degrees.

Proceeding to step S250 when the included angle is within the first predetermined angle range, so the processing unit 30 may output a controlling signal according to a ratio of the position where the intersection point is located. More specifically, the processing unit 130 may first calculate a first ratio according to a position of the intersection point within the first skeleton, and calculate a second ratio according to a position of the intersection point within the second skeleton. A pause controlling signal representing a pause function is output when at least one of the first ratio and the second ratio is less than a first threshold value. A stop controlling signal representing a stop function is output when both of the first ratio and the second ratio are within a predetermined ratio range. Among which, the first threshold value may be set to 0.2; the predetermined ratio range R1 may be set as $0.3 \leq R1 \leq 0.7$.

Figure 4:
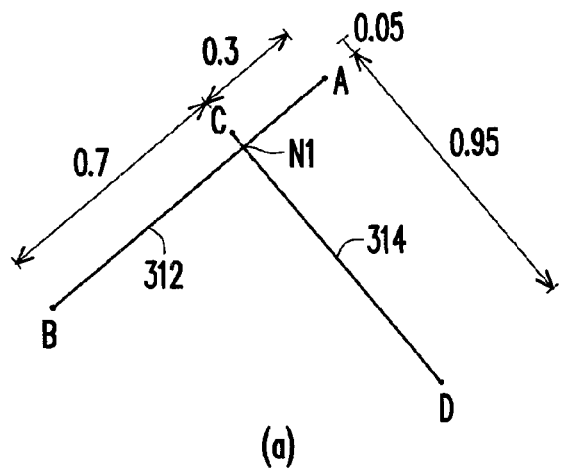
FIG. 4(a) is an enlarged schematic view of the hand skeleton depicted in FIG. 3(a).
FIG. 4(b) is an enlarged schematic view of the hand skeleton depicted in FIG. 3(b).
Figure 4:
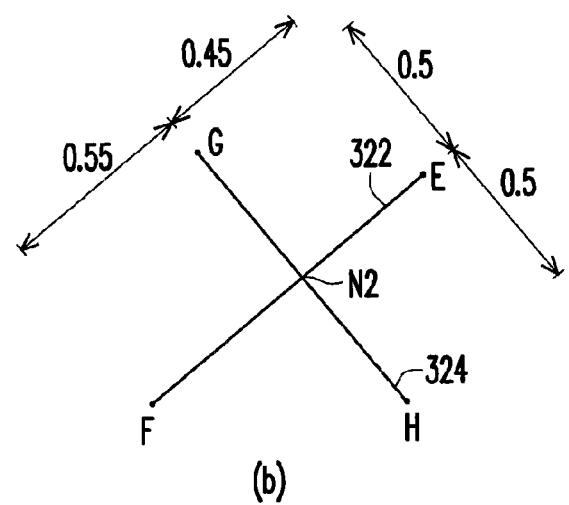

FIG. 4(a) is an enlarged schematic view of the hand skeleton depicted in FIG. 3(a). Referring to FIG. 4(a), the processing unit 130 may calculate a first ratio by calculating a length between an end point A and the intersection point N1 with the end point A as a starting point, and dividing the length with a length between end points A and B. In the present embodiment, the first ratio is, for example, 0.3. Furthermore, the processing unit 130 may calculate a second ratio by calculating a length between an end point C and the intersection point N1 with the end point C as a starting point, and dividing the length with a length between end points C and D. In the present embodiment, the second ratio is, for example, 0.05. In the present embodiment, it is assumed that the first threshold value is set to 0.2, the processing unit 130 determines that the second threshold value is smaller than the first threshold value, thus the pause controlling signal representing the pause function is output to the smart TV. After said pause controlling signal is received by the smart TV, the command to pause playing may be directed executed.

FIG. 4(b) is an enlarged schematic view of the hand skeleton depicted in FIG. 3(b). Referring to FIG. 4(b), the processing unit 130 may calculate a first ratio by calculating a length between an end point E and the intersection point N2 with the end point E as a starting point, and dividing the length with a length between end points E and F. In the present embodiment, the first ratio is, for example, 0.45. Furthermore, the processing unit 130 may calculate a second ratio by calculating a length between an end point G and the intersection point N2 with the end point G as a starting point, and dividing the length with a length between end points G and H. In the present embodiment, the second ratio is, for example, 0.5. In the present embodiment, it is assumed that the predetermined ratio range R1 is set as $0.3 \leq R1 \leq 0.7$, the processing unit 130 determines that the first ratio and the second ratio are both within the predetermined ratio range R1, thus a stop controlling signal representing the stop function is output to the smart TV. After said stop controlling signal is received by the smart TV, the command to stop playing may be directed executed.

Referring back to step S230 depicted in FIG. 2, if the processing unit 130 determines that the intersection point is absent between the first skeleton and the second skeleton, proceeding to step S260 so that the processing unit 130 may determine whether an extended intersection point is exist between extended lines of the first skeleton and the second skeleton. A parallel operating gesture performed by the user may not be completely parallel due to deviations. Therefore, if the extended intersection point is exist between the extended lines of the first skeleton and the second skeleton, the processing unit 130 further determines whether an included angle formed by the extended intersection point is within a second predetermined angle range, and the second predetermined angle range may be, for example, 10 to −10 degrees (step S270). If the included angle is within the second predetermined angle range, the processing unit 130 may still determine that it is the parallel operating gesture and proceed to step S280. If the included angle is not within the second predetermined angle range, proceeding back to step S210 for re-capturing the pending image.

In step S280, the processing unit 130 calculates a midpoints-connection length between the first skeleton and the second skeleton and generates a control signal correspondingly according to a variation of the midpoints-connection length. For instance, the processing unit 130 outputs a first volume controlling signal representing a volume-up function to the smart TV when the midpoints-connection length is increased; and outputs a second volume controlling signal representing a volume-down function to the smart TV when the midpoints-connection length is reduced. The smart TV receives the volume controlling signal to execute command for volume-up or volume-down correspondingly.

Figure 5:
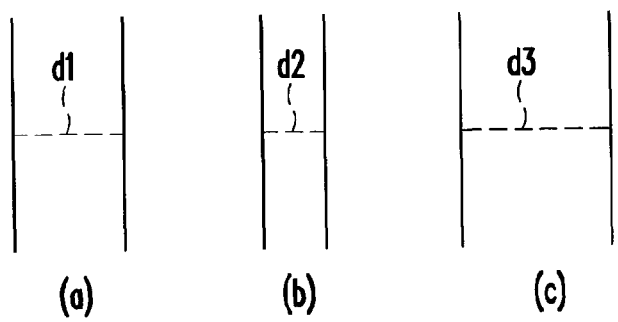
FIG. 5(a) to FIG. 5(c) are schematic views illustrating a variation to a midpoints-connection length between the first skeleton and the second skeleton.

An amount of volume-up or volume-down may also be controlled the midpoints-connection length, the method of utilizing the midpoints-connection length to control a volume adjustment amount correspondingly is described with reference to FIG. 5(a) to FIG. 5(c) as below. FIG. 5(a) to FIG. 5(c) are schematic views illustrating a variation to a midpoints-connection length between the first skeleton and the second skeleton.

In case when the processing unit 130 determines that the midpoints-connection length of the first skeleton and the second skeleton is switched from the FIG. 5(a) to FIG. 5(b), which means that the midpoints-connection length d1 depicted in FIG. 5(a) is reduced to the midpoints-connection length d2 depicted in FIG. 5(b). In an embodiment of the invention, if a distance between two-hands of the user remains unchanged, namely, the midpoints-connection length remains at the midpoints-connection length d2 depicted in FIG. 5(b), the processing unit 130 may output a volume controlling signal for volume-down continuously until the user completes the parallel operating gesture two-hands. In another embodiment, the processing unit 130 may output the volume controlling signal based on a predetermined corresponding relation between the midpoints-connection and a volume control. For instance, the midpoints-connection length being 100 cm is corresponding to a volume being 100%, the midpoints-connection length being 50 cm is corresponding to the volume being 50%, and so on. The volume is adjusted correspondingly based on a ratio relation of the midpoints-connection length. In yet another embodiment, the processing unit 130 may output the volume controlling signal for volume-down with one unit of the volume when the midpoints-connection length is switched from FIG. 5(a) to FIG. 5(b); and the processing unit 130 may output the volume controlling signal for volume-up with one unit of the volume when the midpoints-connection length is switched from FIG. 5(a) to FIG. 5(c). The method of adjusting volume based on the midpoints-connection length is not limited to the above, details in above embodiment may be changed based on practical requirements.

The methods for the processing unit 130 to obtain the hand skeleton information by analyzing the human form image as illustrated in step S220 of FIG. 2 will be described below with an example.

A first analyzing method mainly utilizes a human face recognizing technology for analyzing. More specifically, the processing unit 130 may perform a human face detection to the 2D image obtained by the image capturing unit 110, so as to determine position information of the human face in the 2D image and stores the position information in the storage unit 120. Next, the processing unit 130 may correspond to the position information of the human face in the 2D image to the 3D image, so as to obtain the depth information of the human face position in the 3D image. Next, the processing unit 130 may obtain a two-hands image within a predetermined depth range based on the depth information of the human face location information, the predetermined depth range may be set by person skilled in the art based on practical requirements. For instance, two hands of the user are usually located in front of a face portion of the user, so that the predetermined depth range may be, for example, set to a depth range from a depth of the human face towards a direction where the depth is shallower. After the two-hand image within the predetermined depth range is obtained by the processing unit 130, the hand skeleton information of the two-hands may be obtained accordingly to the two-hands image.

A second analyzing method mainly utilizes a full body skeleton recognizing technology for analyzing. More specifically, the processing unit 130 may, for example, obtain a full body skeleton of the human form directly by utilizing the 3D image captured by the image capturing unit 110. Next, the processing unit 130 may then obtain the hand skeleton information based on the full body skeleton. For instance, the processing unit 130 may first obtain a predetermined feature of the full body skeleton as to determine a two-hand skeleton, the predetermined feature may be, for example, a n-th section skeleton counted from an end point, said predetermined feature may be set by person skilled in the art based on practical requirements.

Figure 6:
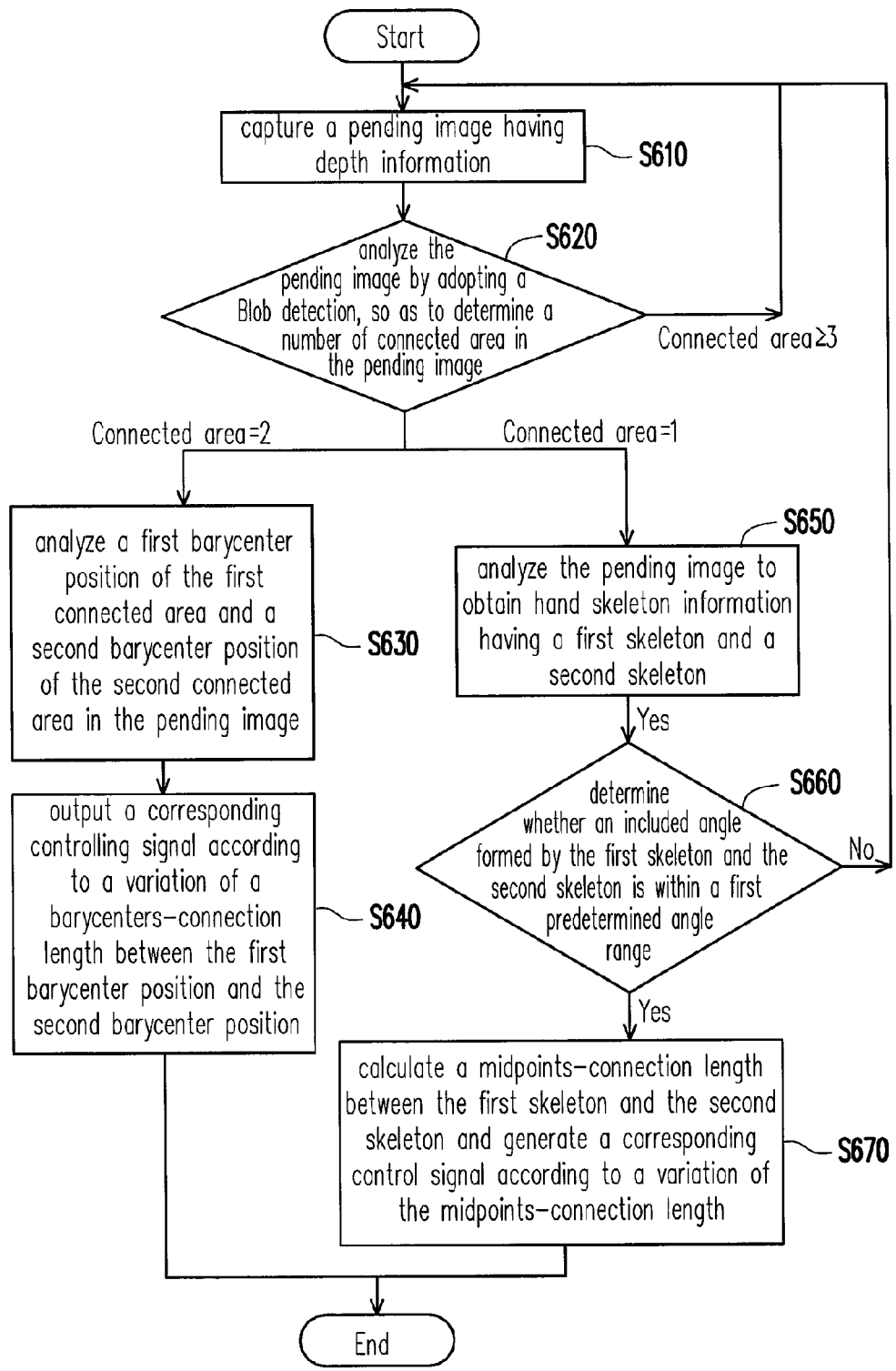
FIG. 6 is a flowchart illustrating a gesture recognizing and controlling method according to another embodiment of the invention.

FIG. 6 is a flowchart illustrating a gesture recognizing and controlling method according to another embodiment of the invention. Said method of the present embodiment is also adapted for the gesture recognizing and controlling device 100 depicted in FIG. 1, it is described below with reference to FIG. 6 and FIG. 1.

Figure 7:
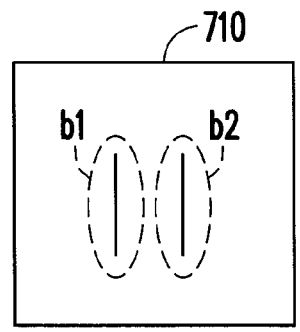
FIG. 7(a) to FIG. 7(c) are schematic views illustrating a number of connected area according to another embodiment of the invention.
Figure 7:
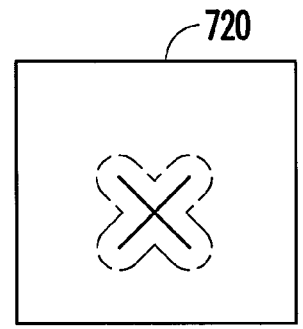
Figure 7:
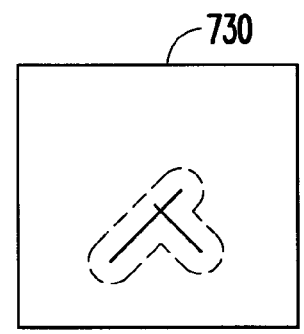

In step S610, the image capturing unit 110 captures a pending image having depth information. In step S620, the processing unit 130 analyzes the pending image by adopting a Blob detection, so as to determine a number of connected area in the pending image. For instance, FIG. 7(a) to FIG. 7(c) are schematic views illustrating a number of connected area according to another embodiment of the invention. A pending image 710 depicted in FIG. 7(a) includes a first connected area b1 and a second connected area b2; A pending images 720 depicted in FIG. 7(b) and a pending image 730 depicted in FIG. 7(b) respectively include only one connected area.

In step S630, the processing unit 130 analyzes a first barycenter position of the first connected area b1 and a second barycenter position of the second connected area b2 in the pending image when the number of connected area is two. Next in step S640, a controlling signal is output correspondingly according to a variation of a barycenters-connection length between the first barycenter position and the second barycenter position. For instance, the processing unit 130 outputs a first volume controlling signal representing a volume-up function to the smart TV when the barycenters-connection length is increased; and outputs a second volume controlling signal representing a volume-down function to the smart TV when the barycenters-connection length is reduced. Step S640 is similar to step S280 in the foregoing embodiment, so that detail step of utilizing the barycenters-connection length to control amount of volume-up or volume-down is similar or identical to description for the midpoints-connection length in the foregoing embodiment, thus it is omitted herein.

Returning back to step S620 depicted in FIG. 6, if the number of connected area is one, proceeding to step S650, in which the processing unit 130 analyzes the pending image to obtain hand skeleton information having a first skeleton and a second skeleton. Since the number of connected area is known as being one, the intersection point is definitely exist between the first skeleton and the second skeleton, as shown in FIG. 7(b) and FIG. 7(c). Thus in the present embodiment, the step of determining whether the intersection point is exist between the first skeleton and the second skeleton. In step S660, the processing unit 130 proceeded to determine whether an included angle formed by the first skeleton and the second skeleton is within a first predetermined angle range. This step may be used to, for example, filter and exclude a gesture operation of one single hand in case of the number of connected area being one. Returning back to step S610 if the determination in step S660 is negative. Proceeding to step S670 when the included angle is within the first predetermined angle range, and the processing unit 130 may output a controlling signal according to a ratio of the position where the intersection point is located. Therein, the control signal may be, for example, the pause controlling signal representing the pause function or the stop controlling signal representing the stop function. Steps S650, S660 and S670 of the present embodiment are respectively similar or identical to steps S220, S240 and S250 of the foregoing embodiment, thus related description is omitted herein.

The difference between the present embodiment and the foregoing embodiment is that the present embodiment utilizes the Blob detection first to quickly determine the number of connected area in the pending image. If the number of connected area is two, it is directly determined that the user is performing the parallel operating gesture with two-hands. Accordingly, calculations for analyzing the hand skeleton information may be partially omitted, so as to reduce time required for recognizing the gesture control.

In view of above, the invention utilizes the depth information and a corresponding human skeleton detection to reduce steps required for recognizing gesture, such as background deletion and noise to be filtered, so as to further reduce time required for recognizing gesture. Further, by analyzing the hand skeleton information as to output the control signal to the multimedia device directly, the predetermined application may be executed directly by the multimedia device according to the control signal. Accordingly, the gesture may be utilized to achieve operations similar to a hot-key function and reduce steps for the user to control a cursor with gestures on a display monitor of the multimedia device, so as to achieve a quicker and more convenient real-time human-computer interaction.

It will be apparent to those skilled in the art that various modifications and variations can be made to the structure of the disclosed embodiments without departing from the scope or spirit of the disclosure. In view of the foregoing, it is intended that the disclosure cover modifications and variations of this specification provided they fall within the scope of the following claims and their equivalents.

What is claimed is:

1. A gesture recognizing and controlling method, comprising:
   capturing a pending image having depth information, wherein the pending image comprises a human form image;
   analyzing the pending image first by adopting a Blob detection thereby determining a number of connected area in the pending image;
   analyzing a first barycenter position of a first connected area and a second barycenter position of a second connected area in the pending image when the number of connected area is two; and
   outputting another controlling signal correspondingly according to a variation of a barycenters-connection length between the first barycenter position and the second barycenter position;
   analyzing the human form image to obtain hand skeleton information having a first skeleton and a second skeleton, wherein the first skeleton and the second skeleton respectively corresponding to a left hand and a right hand of the human form image;
   determining whether an intersection point exists between the first skeleton and the second skeleton;
   determining whether an included angle formed by the first skeleton and the second skeleton is within a first predetermined angle range if the intersection point exists, wherein the intersection point segments the first skeleton into a first segment and a second segment, and the intersection point segments the second skeleton into a third segment and a fourth segment;
   outputting a controlling signal when the included angle is within the first predetermined angle range;
   calculating a first ratio between the first segment and the second segment, and calculating a second ratio between the third segment and the fourth segment; and
   outputting a controlling signal based on the first ratio and the second ratio.

2. The gesture recognizing and controlling method of claim 1, wherein the step of outputting the controlling signal based on the first ratio and the second ratio comprises:
   outputting a pause controlling signal representing a pause function when at least one of the first ratio and the second ratio is less than a first threshold value; and
   outputting a stop controlling signal representing a stop function when both of the first ratio and the second ratio are within a predetermined ratio range.

3. The gesture recognizing and controlling method of claim 1, wherein when the intersection point is absent between the first skeleton and the second skeleton, the gesture recognizing and controlling method further comprises:
   determining whether an extended intersection point exists between extended lines of the first skeleton and the second skeleton;
   determining whether an included angle of the extended intersection point is within a second predetermined angle range if the extended intersection point exists; and
   outputting another controlling signal when the included angle of the extended intersection point is within the second predetermined angle range.

4. The gesture recognizing and controlling method of claim 3, wherein when the intersection point is absent between the first skeleton and the second skeleton, the gesture recognizing and controlling method further comprises:
   calculating a midpoints-connection length between the first skeleton and the second skeleton; and
   outputting said another controlling signal correspondingly according to a variation of the midpoints-connection length.

5. The gesture recognizing and controlling method of claim 4, wherein the step of outputting said another controlling signal correspondingly according to the variation of the midpoints-connection length further comprises:
   outputting a first volume controlling signal representing a volume-up function when the midpoints-connection length is increased, and outputting a second volume controlling signal representing a volume-down function when the midpoints-connection length is reduced.

6. The gesture recognizing and controlling method of claim 1, wherein when the intersection point is absent between the first skeleton and the second skeleton, the gesture recognizing and controlling method further comprises:
   calculating a midpoints-connection length between the first skeleton and the second skeleton; and
   outputting said another controlling signal correspondingly according to a variation of the midpoints-connection length.

7. A gesture recognizing and controlling method, comprising:
   capturing a pending image having depth information;
   analyzing the pending image by adopting a Blob detection thereby determining a number of connected area in the pending image;
   analyzing a first barycenter position of a first connected area and a second barycenter position of a second connected area in the pending image when the number of connected area is two; and
   outputting a controlling signal correspondingly according to a variation of a barycenters-connection length between the first barycenter position and the second barycenter position.

8. The gesture recognizing and controlling method of claim 7, wherein the step of outputting said another controlling signal correspondingly according to the variation of the barycenters-connection length further comprises:
   outputting a first volume controlling signal representing a volume-up function when the barycenters-connection length is increased; and
   outputting a second volume controlling signal representing a volume-down function when the barycenters-connection length is reduced.

9. The gesture recognizing and controlling method of claim 7, wherein when the number of connected area is one, the gesture recognizing and controlling method further comprises:
   analyzing a human form image in the pending image thereby obtaining hand skeleton information having a first skeleton and a second skeleton;
   determining whether an intersection point exists between the first skeleton and the second skeleton;

determining whether an included angle formed by the first skeleton and the second skeleton is within a first predetermined angle range if the intersection point exists; and outputting another controlling signal when the included angle is within the first predetermined angle range.

10. The gesture recognizing and controlling method of claim 9, further comprising:

calculating a first ratio according to a position of the intersection point within the first skeleton, and calculating a second ratio according to a position of the intersection point within the second skeleton;

outputting a pause controlling signal representing a pause function when at least one of the first ratio and the second ratio is less than a first threshold value; and outputting a stop controlling signal representing a stop function when both of the first ratio and the second ratio are within a predetermined ratio range.

11. A gesture recognizing and controlling device, comprising:

an image capturing unit capturing a pending image having depth information, wherein the pending image comprises a human form image;

a storage unit storing the pending image and a computer readable and writable software; and a processing unit executing a plurality of commands of the computer readable and writable software, wherein the commands comprise:

analyzing the pending image first by adopting a Blob detection thereby determining a number of connected area in the pending image;

analyzing a first barycenter position of a first connected area and a second barycenter position of a second connected area in the pending image when the number of connected area is two; and outputting another controlling signal correspondingly according to a variation of a barycenters-connection length between the first barycenter position and the second barycenter position;

analyzing the human form image to obtain hand skeleton information having a first skeleton and a second skeleton, wherein the first skeleton and the second skeleton respectively corresponding to a left hand and a right hand of the human form image;

determining whether an intersection point exists between the first skeleton and the second skeleton;

determining whether an included angle formed by the first skeleton and the second skeleton is within a first predetermined angle range if the intersection point exists, wherein the intersection point segments the first skeleton into a first segment and a second segment, and the intersection point segments the second skeleton into a third segment and a fourth segment; and outputting a controlling signal when the included angle is within the first predetermined angle range;

calculating a first ratio between the first segment and the second segment, and calculating a second ratio between the third segment and the fourth segment; and outputting a controlling signal based on the first ratio and the second ratio.

12. The gesture recognizing and controlling device of claim 11, wherein the storage unit further stores the hand skeleton information and the intersection point, and said commands executed by the processing unit further comprises:

outputting a pause controlling signal representing a pause function when at least one of the first ratio and the second ratio is less than a first threshold value; and outputting a stop controlling signal representing a stop function when both of the first ratio and the second ratio are within a predetermined ratio range.

13. The gesture recognizing and controlling device of claim 11, wherein when the intersection point is absent between the first skeleton and the second skeleton, said commands executed by the processing unit further comprises:

determining whether an extended intersection point exists between extended lines of the first skeleton and the second skeleton;

determining whether an included angle of the extended intersection point is within a second predetermined angle range if the extended intersection point exists; and outputting another controlling signal when the included angle of the extended intersection point is within the second predetermined angle range.

14. The gesture recognizing and controlling device of claim 13, wherein said commands executed by the processing unit further comprises:

calculating a midpoints-connection length between the first skeleton and the second skeleton; and generating said another controlling signal correspondingly according to a variation of the midpoints-connection length.

15. The gesture recognizing and controlling method of claim 14, wherein the storage unit stores the midpoints-connection length, and the command executed by the processing unit for generating said another controlling signal further comprises:

outputting a first volume controlling signal representing a volume-up function when the midpoints-connection length is increased, and outputting a second volume controlling signal representing a volume-down function when the midpoints-connection length is reduced.

* * * * *